US005749224A

United States Patent [19]

Bebensee et al.

[11] Patent Number: 5,749,224

[45] Date of Patent: May 12, 1998

[54] EXTENDED RANGE THRUSTER SYSTEM AND METHOD OF DETERMINING THRUST

[75] Inventors: Douglas W. Bebensee, Jeddo; Michael J. Stringer, Capac, both of Mich.

[73] Assignee: Patriot Sensors & Controls Corporation, Clawson, Mich.

[21] Appl. No.: 529,000

[22] Filed: Sep. 15, 1995

[51] Int. Cl.[6] .............................. F16D 31/02

[52] U.S. Cl. .............. 60/473; 60/474; 29/888.021; 415/912; 416/146 R

[58] Field of Search .............. 60/473, 474, 475, 60/476, 479; 29/888.021, 888.024, 888.025; 415/912; 416/146 R

[56] References Cited

U.S. PATENT DOCUMENTS

| | | | |
|---|---|---|---|
| 1,993,612 | 3/1935 | Lum | 60/474 |
| 2,277,836 | 3/1942 | Arnold | 60/474 |
| 3,543,368 | 12/1970 | Marlow | 415/912 |
| 3,593,522 | 7/1971 | Angert et al. | 60/53 |
| 3,891,025 | 6/1975 | Bollig et al. | 164/154 |
| 4,055,947 | 11/1977 | Gongwer | 60/221 |
| 4,196,797 | 4/1980 | Taylor | 192/2 |

FOREIGN PATENT DOCUMENTS

| | | | |
|---|---|---|---|
| 46502 | 4/1977 | Japan | 415/912 |
| 991406 | 5/1965 | United Kingdom | 415/912 |

OTHER PUBLICATIONS

Gemco Industrial Brakes Catalog ("Industrial Brake Products Electro–Thrust Shoe Brakes"), May 1994, 13 pgs.

*Primary Examiner*—F. Daniel Lopez
*Attorney, Agent, or Firm*—Young & Basile, P.C.

[57] ABSTRACT

An electrohydraulic actuator has a housing divided into pump and cylinder portions respectively containing a centrifugal impeller driven through a hub by an externally mounted motor, and a pushrod actuated by a piston and arranged to advance the piston and pushrod to deliver thrust when the motor is operated. The major parts except the motor and the pushrod are castings and only one size castings are required for a large range of thrust capacities. The impeller casting is machined to a diameter suitable for a desired thrust and a motor of required speed and horsepower for that thrust capacity is selected to drive the impeller.

15 Claims, 2 Drawing Sheets

EXTENDED RANGE THRUSTER SYSTEM AND METHOD OF DETERMINING THRUST

FIELD OF THE INVENTION

This invention relates to electrohydraulic actuators and particularly to an actuator system and a method for making actuators in a large range of thrust capacity with minimal variation in parts.

BACKGROUND OF THE INVENTION

Electrohydraulic actuators, also called thrusters, are widely used as release mechanisms for industrial brakes. Such brakes have shoes or calipers applied to a drum or disc via a spring biased linkage, and removed from the drum against the spring bias by the linear thrust of an actuator. Such brakes vary in size over a wide range and the thrust capacity of the actuator must be selected to impart the correct force to the brake linkage.

Such electrohydraulic actuators have a motor driven impeller coupled through hydraulic fluid to a piston which drives a push rod. When the motor is energized the impeller produces a pressure in the fluid which causes the piston and pushrod to advance. The pushrod is coupled to the brake linkage to release the brake and hold the brake in the released position as long as the motor is rotating the impeller. When the motor is turned off, the fluid is allowed to return through the impeller and the pushrod and piston are driven back under influence of the spring bias. Usually the spring is external of the actuator but in some cases it is integrated into the actuator, coiled around the pushrod.

Typically the actuators are either of the inline type or the box type. In the inline type the motor and pushrod are aligned on the same axis and are positioned at opposite ends of the unit. A housing encloses the motor, impeller, pushrod and piston. In the box type of actuator, the motor and impeller axis is parallel to and adjacent to the piston and pushrod axis. The box type has a rectangular housing containing the impeller, piston and pushrod, but the motor is mounted externally. To accommodate the different thrust forces required for various applications, different motors, impellers and other parts are required. In both types of actuators heretofore available, the housing, motor, impeller and piston are sized and specially made for each thrust value, so that a whole family of the parts is required to span a large thrust range. This design approach leads to very high costs since common parts are not employed. Moreover, the actuators made in that manner cannot be converted to use in a different thrust capacity.

SUMMARY OF THE INVENTION

It is therefore an object of the invention to accommodate a large range of thrust in one size of electrohydraulic actuator. Another object in such an actuator is to utilize a variety of impeller sizes all made from the same size casting to implement different thrust capacities. A further object in such an actuator is to accept a variety of motor types all having industry standard mounting configurations. Still another object is to manufacture actuators from a single set of blanks having a large range of thrusts. An additional object is to enable change of thrust in the field by replacing a part by another part made from the same size blank.

The invention is carried out by casting a set of parts including a rectangular housing divided by a web into a pump chamber and a cylinder, a piston, a cylinder lid, a pump lid, and an impeller, and providing a pushrod for assembly to the piston, and a set of motors having different characteristics and a standard mount. Optionally, the piston may not be a cast part. These parts are machined to fit together and assembled with the pushrod, motor, an impeller hub and suitable seals and fasteners. In particular, the piston and pushrod are assembled with the cylinder lid which is then attached to cover the cylinder, and the motor and impeller are assembled with the pump lid which is then fastened to cover the pump chamber. The housing contains passages to allow fluid flow between the pump chamber and the cylinder.

Upon motor operation the fluid is pumped to the cylinder to move the piston to extend the pushrod, and when operation ceases, the piston and pushrod are allowed to retract under an external force or an internal spring force. The thrust of the pushrod is dependent on the piston diameter, the impeller diameter and the motor speed and horsepower. Thus by machining the impeller casting to the desired diameter and selecting the proper motor, a thrust capacity chosen from a large range of thrust capacities can be attained. Since only one casting design is used for each part, regardless of the thrust capacity, the manufacture of the actuator is much less expensive than a design which requires several sizes of each part to cover the thrust range. Further, since industry standard motors are used rather than those with custom machined housings and/or shafts, motors are less expensive than in prior actuators and are readily obtained from suppliers other than the maker of the actuator.

In use it may be desired to change the thrust of an actuator to a different value. This is especially useful where a variety of thrusters are in service by a user and spare actuators are kept to replace a unit in service. A spare actuator is then readily modified to meet the required thrust by exchanging the impeller for one of a different diameter and/or replacing the motor with one having the desired speed and horsepower. Moreover, the motor is selected according to the user's needs from dc, single phase and polyphase motors, all having industry standard mounts.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
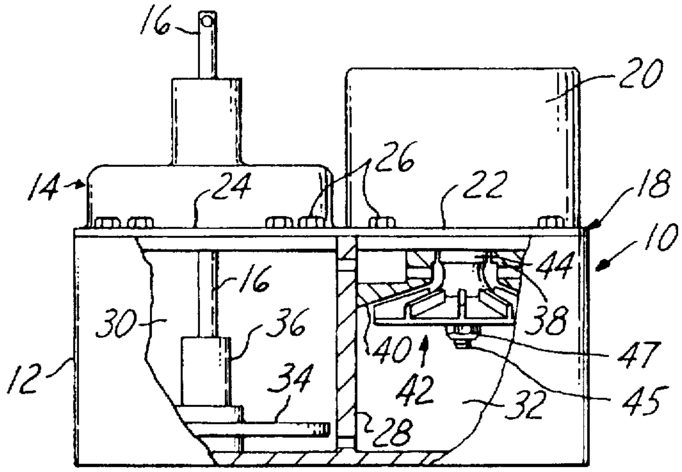
FIG. 1 is a partly broken-away front elevation view of an electrohydraulic actuator according to the invention.
Figure 2:
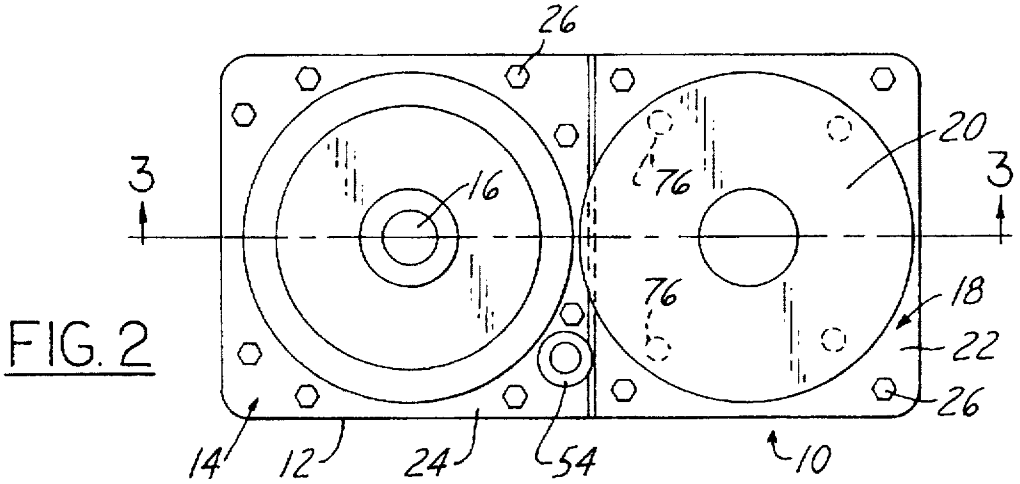
FIG. 2 is a top view of the actuator of FIG. 1.

Referring to FIGS. 1 and 2, an electrohydraulic actuator 10 of the box type which is commonly used for releasing and applying industrial brakes comprises a generally rectangular housing 12 having an open top, a cylinder lid 14 closing a portion of the open top, a pushrod 16 extending up through the cylinder lid 14, a pump lid 18 closing the remaining portion of the open top, and an electric motor 20 supported on the pump lid. The pump lid 18 and the cylinder lid 14 have respective rectangular flanges 22 and 24 which overlie the housing top and are fastened to the housing by bolts 26. Within the housing 12 a web 28 separates the interior into a cylinder 30 and a pump chamber 32. The cylinder 30 and at least the top portion of the pump chamber 32 comprise machined bores. A piston 34 in the cylinder is fastened to the bottom end of the pushrod 16 and a spacer 36 surrounding the pushrod limits the travel of the piston to a desired stroke. The pump lid 18 includes an inner portion 38 having a conical recess 40 at its bottom surface and a centrifugal impeller 42 nests in the recess. The impeller 42 is attached to a hollow hub 44 one end of which extends through a bore in the pump lid 18 and is coupled to the shaft of the motor 20. The other end of the hub extends through a bore in the impeller and terminates in a threaded shaft 45. A nut 47 on the shaft 45 holds the impeller and hub together.

When the motor is operated the piston and pushrod move upwardly with a force or thrust which is determined by the motor and the diameter of impeller 42, as will be discussed further below, as well as by the piston diameter. When the motor operation ceases, the thrust is removed and the pushrod is allowed to retract to its lowest position. The external load imposed on the pushrod by the brake apparatus or other utilization device pushes the pushrod to its retracted position. It is known, however, to include a return spring in the housing, for example a coil spring around the pushrod, instead of relying on an external return force.

Figure 4:
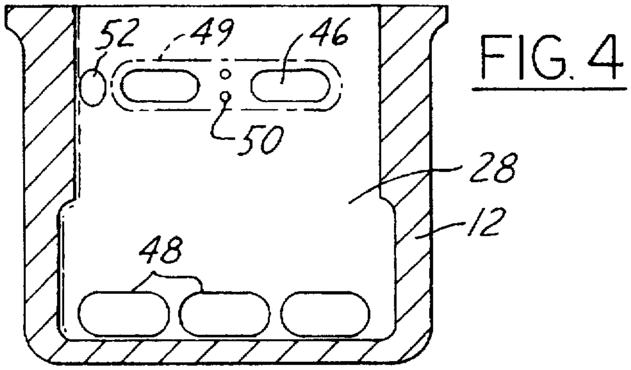
FIG. 4 is a sectional view of the housing of the actuator taken along line 4—4 of FIG. 3.
Figure 3:
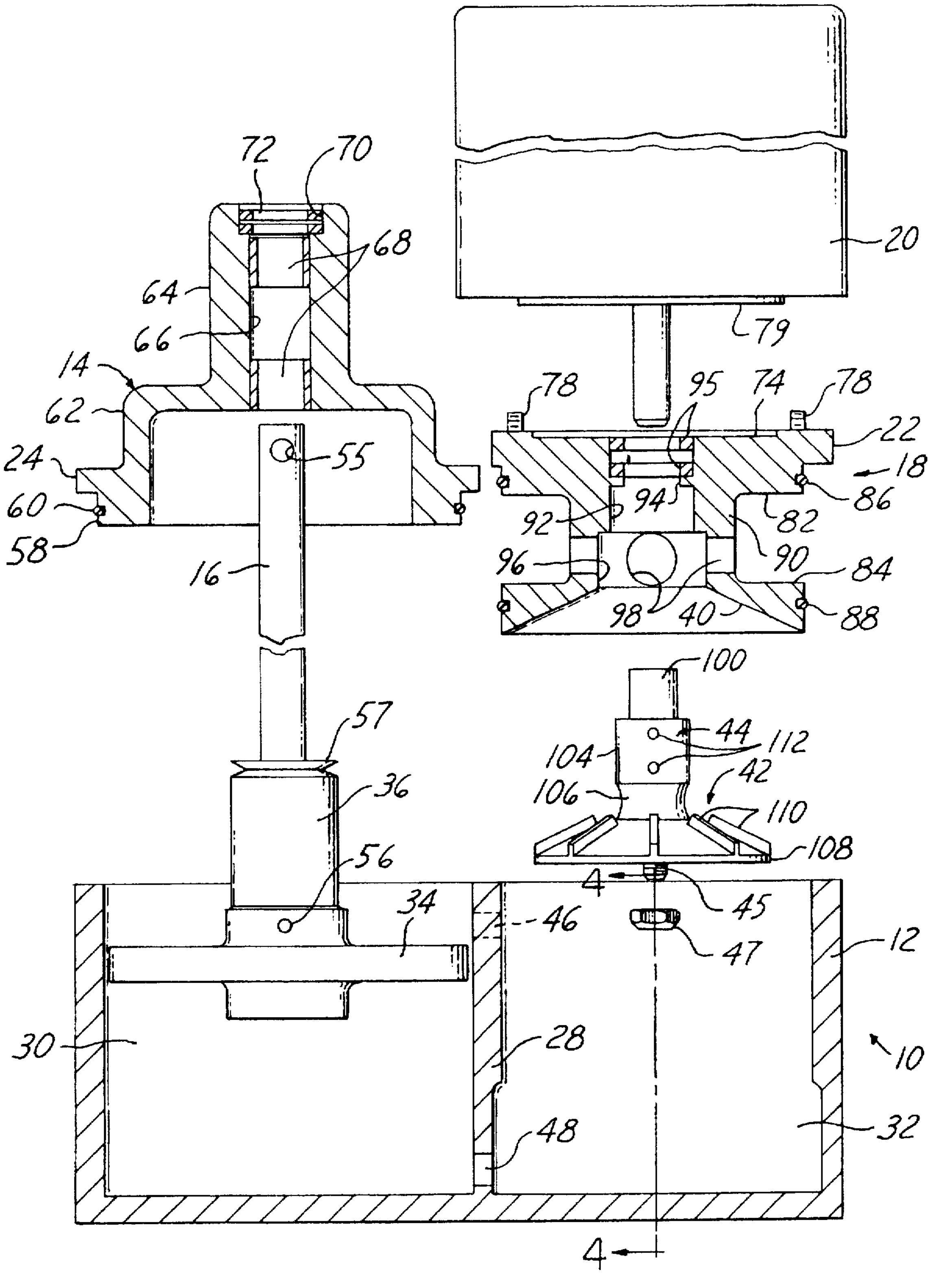
FIG. 3 is an exploded partly sectional view of the actuator of FIG. 1 taken along line 3—3 of FIG. 2.

The inner mechanism of the actuator is further revealed in the exploded view of FIG. 3 wherein the pump lid 18, the cylinder lid 14 and the housing 12 are presented in section for clarity. The housing web 28, also shown in FIG. 4, has upper passages 46 and lower passages 48 for circulation of hydraulic fluid between the pump chamber 32 and the cylinder 30. Optionally, a reed valve 49 (shown in broken lines) is mounted to one or both sides of the upper passages by the screw holes 50. In that case the fluid flows through a bypass 52 adjacent the upper passages 46 and, as is well known in the art, a plug valve (not shown) in the bypass 52 is adjustable to variably restrict the flow rate to modify the pushrod velocity. An access plug 54 (FIG. 2) indicates the position of the plug valve in the web.

The pushrod 16 has an attachment hole 55 in its upper end and is seated in a hollow hub of the piston 34 at its lower end, being secured by roll pins 56. The spacer 36 sits atop the piston and is sized longitudinally to define the pushrod stroke. A pair of bellville springs 57 on the pushrod between the spacer and the cylinder lid serve to cushion the stop at the end of the stroke. The cylinder lid 14 includes an inner boss 58 below the flange 24 which fits within the cylinder 30 and has a circumferential groove containing an O-ring seal 60. An external tower 62 above the flange 24 includes an upper hub 64 having a bore 66 into which a pair of self-lubricating sintered bronze sleeve bearings 68 are inserted, and an upper counterbore 70 containing two seals 72.

The pump lid 18 outer surface has a shallow recess 74 and recessed holes 76 (FIG. 2) for bolts 78 and serves as an industry standard motor mount. The motor 20 is a NEMA standard 56 C face mount which accepts the bolts 78 and has a machined face 79 which accurately fits in the recess 74. An inner boss 82 depending from the pump lid has a groove containing an O-ring seal 86 for snugly fitting within the bore of the pump chamber, and a member 84 similarly containing a groove and O-ring seal 88 is axially spaced from the boss 82 and also fits within the bore. A labyrinth seal comprising a series of grooves on member 84 may be used instead of O-ring seal 88. A reduced diameter neck 90 connects the spaced members 82 and 84 to define a low pressure cavity which is coupled to the upper passages 46 and the bypass 52. A bore 92 in the pump lid contains an inner flange 94 and a pair of shaft seals 95 are contained within the bore above the flange 94. A larger bore 96 in the neck 90 is contiguous with the bore 92 and to a conical recess 40 in the lower surface of the pump lid. Passages 98 in the neck connect the low pressure cavity with the larger bore 96 to admit fluid to the impeller 42. The impeller comprises a zinc-aluminum alloy carried by a hollow stainless steel hub 44. The nut 47 on the hub shaft 45 holds the impeller on the hub. The hub includes a small diameter portion 100 which extends into the bore 92 to engage the shaft seals 95, and a larger diameter portion 104 which is closely spaced from the lower surface of the inner flange 94. Below the portion 104 a tapered neck 106 of the hub abuts the impeller 42. The impeller has a conical impeller plate 108 having vanes 110 about its upper surface and conforming to the angle of the conical recess 40. The motor 20 shaft extends into the hollow hub 44 and is secured by a pair of set screws 112, so that the impeller is supported by and rotated by the motor 20.

When the motor 20 operates to turn the impeller, fluid is pumped from above the piston 34 through the upper passages 46 and/or bypass 52, through the passages 98 and the lower passages 48 to the lower side of the piston, thereby producing pressure to force the piston up to extend the pushrod 16. When the motor stops, any external force or internal spring force on the pushrod will push the piston down to effect reverse flow of the fluid through the passages and the impeller.

Figure 6:
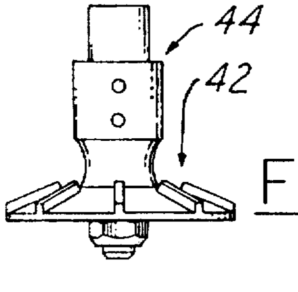
FIGS. 5 and 6 are side views of different diameter impellers and associated hubs, both made from the same size casting.
Figure 5:
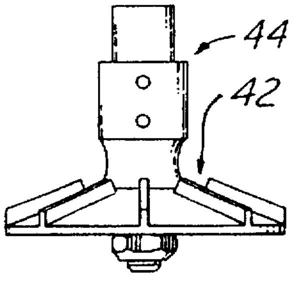

All the major parts of the actuator except the motor 20, the impeller hub 44 and the pushrod 16 (and possibly the piston) are machined from castings; thus the cast parts are the housing 12, the piston 34, the cylinder lid 14, the pump lid 18 and the impeller 42. The same set of castings (or piston dimensions) are used for any thrust capacity from 49 lb. to 718 lb. The only difference in the cast parts is the machined diameter of the impeller. The motor characteristics is the only other factor in determining the desired thrust. Thus to attain a particular one of several possible thrusts, the proper diameter impeller is machined from a cast impeller blank, and the impeller is assembled to the actuator with the proper motor. FIGS. 5 and 6 show a large and a small diameter impeller both machined from the same size impeller casting. Merely installing one or the other along with a suitable motor determines the thrust capacity of the actuator. Likewise, for an actuator already in service, the thrust can be changed easily by changing the impeller and/or the motor. Because of the industry standard motor mount on the pump lid, a wide variety of motors having different speed and horsepower characteristics as well as dc and both single phase and polyphase ac. The following table gives examples of specific motor and impeller combinations:

| RPM | IMPELLER DIAMETER (IN) | HORSE POWER | FORCE (LB) |
|---|---|---|---|
| 1750 | 2.97 | 0.25 | 49 |
| 1750 | 3.28 | 0.25 | 67 |
| 1750 | 3.96 | 0.25 | 112 |
| 3450 | 2.97 | 0.33 | 191 |
| 3450 | 3.59 | 0.50 | 336 |
| 3450 | 4.38 | 0.75 | 560 |
| 3450 | 4.86 | 1.00 | 718 |

Figure 7:
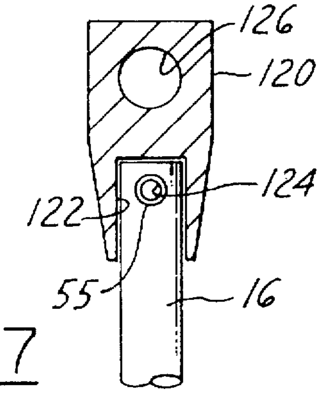
FIG. 7 is a partly sectioned view of a pushrod and adapter for the actuator of FIG. 1.

Another variable which depends on thrust is the attachment of the pushrod to the brake or other mechanism being operated. Generally high thrust applications require a larger connecting pin than low thrust applications so that a small diameter pushrod appropriate for low thrust application will have an attachment hole 55 which is too small for a larger connection pin. One solution is to make different diameter pushrods according to thrust capacity, thereby requiring that the cylinder lid and the piston must have larger bores. This is a matter of machining only, and does not require different size castings. Another solution is to use an adapter to couple a small diameter pushrod to a high thrust utilization device. A suitable adapter 120 is shown in FIG. 7. An elongated adapter of larger diameter than the pushrod has a bore 122 to fit a small diameter pushrod 16 and has an aperture to receive a roll pin 124 which fastens the adapter to the attachment hole 55 of the pushrod 16. A large hole 126 in the upper part of the adapter 120 is sized to suit the intended application.

It will thus be seen that the actuator design utilizing a range of impellers and motors for various thrusts offers an economical approach to the manufacture of actuators accommodating a large range of thrusts. The single line of castings for the whole range of thrusts minimizes the cost of design, manufacture and inventory. The method of manufacturing the actuators of different thrust capacities by using common castings and selecting proper combinations of impeller diameters and motor characteristics simplifies manufacture. Likewise, after an actuator is in service, it still can be easily changed to another thrust capacity.

An additional feature, not shared by prior art thrusters, is that the actuator may be mounted in any orientation and successfully operated without loss of thrust. In the event that an air bubble is trapped in the device, it does not impair the operation so long as air does not become entrained within the fluid stream and thus enter the impeller, thereby reducing the impeller effectiveness. The actuator structure disclosed here has a place for an air pocket away from the high velocity stream for any orientation, thus avoiding air entrainment. With the shaft vertical and pointing up, the air collects in the cylinder lid. With the shaft pointing down, the air would reside in the "top" of the housing in either the pump or cylinder chamber. If the unit is on its side, the air will collect either in the side of the cylinder chamber or in the low pressure cavity opposite the neck 90 to prevent being drawn into the impeller.

The embodiments of the invention in which an exclusive property or privilege is claimed are defined as follows:

1. An electrohydraulic actuator system wherein thrust pressure on a piston is developed by a motor driven impeller, the system having a large thrust range capability using a standard set of parts and a choice of motors and impellers comprising:

a housing open at one side and divided by a medial web into two portions comprising a pump chamber and a cylinder, and including passages for fluid flow between the pump chamber and the cylinder;

a cylinder lid for covering the cylinder and including a central bore;

a pushrod slidably extending through the bore;

a piston in the bore attached to the pushrod for actuating the push rod;

a motor selectable from motors of different types;

a pump lid for covering the pump chamber having an industry standard motor mount for mounting the motor outside the chamber, and having an inner recess inside the pump chamber; and an impeller selectable from impellers of different diameters, the impeller being located in the inner recess and coupled to the motor, whereby the motor type and impeller diameter determine the actuator thrust.

2. The invention as defined in claim 1 wherein the impellers of different diameters are machined from identical castings.

3. The invention as defined in claim 1 wherein the motor types include motors of different speeds and horsepower and all having the same size mounting flange.

4. The invention as defined in claim 1 wherein the motor types include dc motors, single phase ac motors and polyphase ac motors and all having the same size mounting flange.

5. The invention as defined in claim 1 wherein:

the pump chamber has a cylindrical opening; and the pump lid includes an inner cylindrical boss within the pump chamber opening and sealed by an O-ring between the boss and the chamber.

6. The invention as defined in claim 1 wherein:

the pump chamber is cylindrical;

the pump lid includes an inner cylindrical boss within the pump chamber; and the inner recess is a bore terminating in a conical depression on the end of the boss;

an impeller hub fitting within the bore connects the impeller to the motor; and the impeller is a centrifugal impeller having radial vanes shaped to conform to the conical depression.

7. The invention as defined in claim 1 wherein the pushrod diameter is larger for high thrust capacities than for low thrust capacities.

8. The invention as defined in claim 1 wherein the pushrod diameter is the same for high thrust and low thrust capacities, and an adapter on an outer end of the pushrod is sized for coupling to a utilization device.

9. A method of manufacturing an electrohydraulic actuator having a desired thrust capacity selected from a range of capacities and including a housing containing a piston and pushrod disposed in a cylinder in one compartment of the housing and a motor-driven impeller in another compartment of the housing, comprising the steps of:

making standard parts for the housing, a cylinder lid covering the cylinder, the pushrod, an impeller hub and a pump lid covering the other compartment, wherein the pump lid has an industry standard motor mount;

selecting the motor from a set of motors having various operating characteristics and each having a mount configuration to fit the industry standard mount;

casting a standard impeller blank capable of being machined to a plurality of different diameters and machining the impeller from the blank to a desired diameter in accordance with the desired thrust capacity; and assembling the standard parts, the selected motor and the impeller, wherein the characteristics of the selected motor and the impeller diameter determine the thrust capacity.

10. The invention as defined in claim 9 wherein the set of motors comprises motors of various speeds and horsepower.

11. The invention as defined in claim 9 wherein the set of motors comprises dc motors, ac single phase motors and ac polyphase motors.

12. In an electrohydraulic actuator having a cylinder section with a piston and pushrod and a pump section having an industry standard motor mount, a motor installed on the industry standard mount and an impeller machined from a standard impeller blank capable of being machined to a plurality of different diameters, a method of changing the thrust capacity of the actuator by the steps of:

machining a plurality of impellers of different diameters from identical diameter impeller blanks; and replacing the impeller in the actuator with another impeller of a different diameter to change the thrust capacity of the actuator.

13. The invention as defined in claim 12 including the further step of replacing the motor with another motor of different speed and/or horsepower, whereby the combination of a particular motor characteristic and impeller diameter determine the thrust of the actuator.

14. An electrohydraulic actuator system wherein thrust pressure on a piston is developed by a motor driven impeller, the system having a large thrust range capability using a standard set of parts and a choice of motors and impellers comprising:

a closed housing divided by a medial web into two portions comprising a pump chamber and a cylinder, and including passages for fluid flow between the pump chamber and the cylinder;

a pushrod slidably extending through a bore in the housing;

a piston in the bore attached to the pushrod for actuating the push rod;

a motor selectable from motors of different types;

an industry standard motor mount carried on the housing for mounting the motor outside the pump chamber, and having an inner recess inside the pump chamber; and an impeller machinable to a diameter from an impeller casting capable of being machined of different diameters, the impeller being located in the inner recess and coupled to the motor, whereby the motor type and impeller diameter determine the actuator thrust.

15. The invention as defined in claim 14 wherein the motor types include motors of different speeds and horsepower and all having the same size mounting flange.

* * * * *